US008725609B2

(12) United States Patent
Pawelczyk et al.

(10) Patent No.: US 8,725,609 B2
(45) Date of Patent: May 13, 2014

(54) SYSTEM AND METHOD FOR INTRADAY NETTING PAYMENT FINALITY WITH SUPPLEMENTAL FUNDING

(75) Inventors: Joseph S. Pawelczyk, Morris Plains, NJ (US); James W. Reilingh, Pleasantville, NY (US); Robert M. Cotton, Marlboro, NY (US)

(73) Assignee: The Clearing House Payments Company L.L.C., New York, NY (US)

( * ) Notice: Subject to any disclaimer, the term of this patent is extended or adjusted under 35 U.S.C. 154(b) by 2566 days.

(21) Appl. No.: 10/936,610

(22) Filed: Sep. 8, 2004

(65) Prior Publication Data

US 2005/0086165 A1     Apr. 21, 2005

Related U.S. Application Data

(60) Provisional application No. 60/501,459, filed on Sep. 8, 2003.

(51) Int. Cl.
*G06Q 20/10*     (2012.01)
(52) U.S. Cl.
CPC ..................... *G06Q 20/10* (2013.01)
USPC .......................................................... 705/35
(58) Field of Classification Search
CPC ........ G06Q 20/10; G06Q 40/02; G06Q 20/04
USPC .......................................................... 705/35
See application file for complete search history.

(56) References Cited

U.S. PATENT DOCUMENTS

| 6,076,074 | A  | * | 6/2000 | Cotton et al. ..................... 705/40 |
| 6,353,811 | B1 | * | 3/2002 | Weissman ........................ 705/40 |
| 6,945,453 | B1 | * | 9/2005 | Schwarz, Jr. .................. 235/375 |
| 7,110,993 | B2 | * | 9/2006 | Soulanille et al. ................ 707/3 |
| 7,167,711 | B1 | * | 1/2007 | Dennis ........................ 455/456.1 |
| 7,308,426 | B1 | * | 12/2007 | Pitroda ........................... 705/35 |
| 2002/0010612 | A1 | * | 1/2002 | Smith et al. ....................... 705/8 |
| 2004/0039701 | A1 | * | 2/2004 | Nakamura et al. .............. 705/42 |
| 2005/0010483 | A1 | * | 1/2005 | Ling .............................. 705/26 |
| 2005/0203835 | A1 | * | 9/2005 | Nhaissi et al. .................. 705/39 |

* cited by examiner

*Primary Examiner* — Jessica Lemieux
(74) *Attorney, Agent, or Firm* — Fitzpatrick, Cella, Harper & Scinto

(57) ABSTRACT

A system and method are disclosed for continuous intraday final settlement of payment orders among a plurality of participants, each participant having facilities configured to electronically send and receive the payment orders in the form of payment messages. Primary positions, corresponding to balances in a prefunded balance account, are stored. Supplemental positions, corresponding to balances in the prefunded balance account, are stored. Payment messages are received from sending participants. A selected payment message is released, such that the sending participant's supplemental position is decreased by the payment amount and the receiving participant's supplemental position is increased by the payment amount, if it is determined that: (i) the sending participant's supplemental position, after subtraction of the payment amount, is greater than or equal to the predetermined minimum for the sending participant's supplemental position, and (ii) the receiving participant's supplemental position, after addition of the payment amount, is less than or equal to the predetermined maximum for the receiving participant's supplemental position.

9 Claims, 5 Drawing Sheets

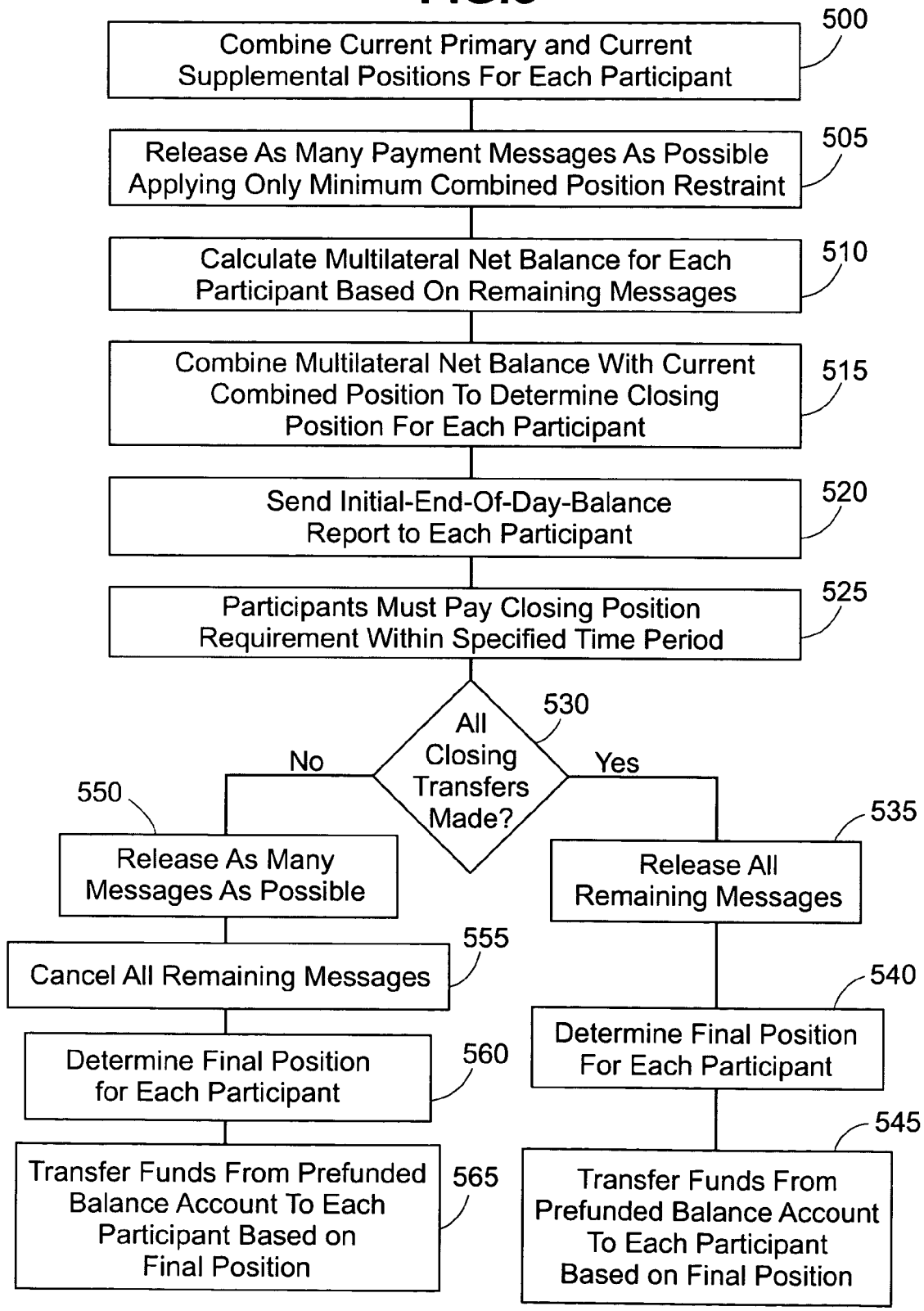

SYSTEM AND METHOD FOR INTRADAY NETTING PAYMENT FINALITY WITH SUPPLEMENTAL FUNDING

CROSS-REFERENCE TO RELATED APPLICATIONS

This application claims the benefit of U.S. Provisional Application No. 60/501,459, filed Sep. 8, 2003, which is incorporated herein by reference in its entirety.

BACKGROUND OF THE INVENTION

1. Field of the Invention

The present invention relates generally to a system and method for multilateral net settlement, in which participants deposit a predetermined amount into a prefunded balance account and send messages to one another incurring obligations to pay. These obligations are netted against each other, giving each participant a net credit position or a net debit position that is settled at the end of the day. More specifically, the present invention relates to an improvement allowing participants to transfer supplemental funds into their prefunded balance account throughout the day, and, for example, is intended to be an improvement to the system and method for Intraday Netting Payment Finality described in U.S. Pat. No. 6,076,074, which is incorporated herein in its entirety by reference.

2. Related Art

A person (individual or corporate) making a payment in the United States has an array of payment instruments from which to choose. It is likely that most single transactions still are paid for in cash (coin and currency). There are also checks and other paper instruments (travelers' checks, money orders, and certified and cashier's checks) and debit and credit entries processed by automated clearing houses ("ACH") (a computer-based, batch processing electronic payment mechanism that supports both credit and debit transfers and is used primarily for low-dollar transactions such as direct deposit of payroll and benefit payments and mortgage and insurance premium payments that can be scheduled some time in advance and that are not time-critical). The largest payments, however, usually are sent by funds transfers. Each day, the two principal funds transfer systems, Fedwire and CHIPS ("Clearing House Interbank Payments System"), transfer hundreds of thousands of payments worth more than $2 trillion. The average size of a funds transfer is very large—about $6 million on CHIPS and $3 million on Fedwire.

Funds transfers can involve a number of different parties. Many transfers take place to settle obligations of two banks, such as the delivery or return of "fed funds" (a bank's deposits with its Federal Reserve Bank, which can be lent to other banks). In these cases, only the two banks are involved. Banks also transfer funds on behalf of customers. These transfers may be to another person, either at the same bank or at another bank. Sometimes a customer moves funds between two of its own accounts, either at different banks or at the same bank, for example, from local accounts used to collect bills to a cash concentration account or to a payroll account.

A funds transfer may involve a single bank (a "book-transfer") or it may involve several. In most cases, the originator does not specify the method for carrying out his payment order, and the originator's bank selects the most efficient way to have the funds sent to the beneficiary, including choosing a network or intermediary bank.

A. Origination of Funds Transfer

There are many ways for a person to order his bank to send a funds transfer. Probably the largest number of funds transfers, and certainly those involving the highest monetary value, are those originated by corporations with a direct computer-to-computer link to the bank. In these cases, the customer enters the payment instructions into his computer, and the computer sends the payment order directly to his bank's computer. The bank's computer "edits" the payment order. If the payment order fails one of the edits, for example, if mandatory information has not been included in the payment order, the computer routes the payment order to an operator's screen, and the operator makes any necessary corrections or seeks (or has someone else in the bank seek) clarification from the customer. A similar procedure is used for customers who use a personal computer to transmit payment orders to the bank. Individuals generally must go to the bank to fill out a form and pay a fee for a funds-transfer service.

B. Originator's Bank's Acceptance of Payment Order

Once the payment order has been entered into the bank's funds-transfer computer system and passes the initial edits, it is checked against the customer's demand account balance. If the balance is sufficient, the bank executes the payment order by issuing a corresponding payment order to a funds-transfer network or the next bank in the finds transfer. If the customer does not have a sufficient balance in his account, the computer checks to see if the customer has an available credit line. If so, the payment is released; if not, the payment is held pending receipt of funds to cover the payment. If covering finds have not been received by the late afternoon (usually 2:00 to 4:00 p.m.), the payment order may be referred to a credit officer who decides whether to extend additional credit to the customer to enable the payment to be made.

If a payment order has not been sent by the end of the execution date (the date that the bank may properly issue a payment order in execution of the sender's order), the bank normally rejects it by sending a notice of the rejection to the sender.

C. Transfers Between Banks

If there is more than one bank involved in a funds transfer, it is necessary for funds to be moved from one bank to the other. In the U.S., this can be accomplished by using one of the two large-dollar funds transfer networks to be discussed below, or through the adjustment of correspondent balances.

1. Fedwire

One of these transfer networks is "Fedwire", which is the funds transfer network operated by the 12 Federal Reserve Banks. It is a real-time, gross settlement system, meaning that the payment is final and irrevocable at the time the Federal Reserve Bank credits the account on its books of the receiving bank. There is thus no risk that the receiving bank will suffer a loss if it makes the funds available to the beneficiary and the sender cannot pay the amount of the payment order to its Federal Reserve Bank. In such a case, the Federal Reserve Bank would suffer the loss, not the receiving bank. A payment order received by a Federal Reserve Bank is routed to a Fedwire processing computer. This computer performs system edits and routes the payment order to the receiving Federal Reserve Bank, which automatically credits the receiving bank's account and sends an advice to the receiving bank.

2. CHIPS

The other such transfer network, is the Clearing House Interbank Payments System ("CHIPS"), which is a funds-transfer system operated by The Clearing House Payments Company L.L.C. ("Clearing House"). A CHIPS participant (a "participant" is defined as a financial institution that may deliver and receive payment messages through CHIPS) that sends a CHIPS payment message to another participant incurs an obligation to pay the receiving participant the amount of the transfer. This obligation is settled in accordance with the system and method for intraday payment finality described in U.S. Pat. No. 6,076,074.

As an alternative to these funds-transfer networks, if a bank has a correspondent relationship with the bank holding the beneficiary's account, or if the bank does not have direct access to a funds-transfer network, it may use debits and credits to various correspondent accounts to complete a funds transfer. Often a bank sends a payment order over the network operated by the Society for Worldwide Interbank Financial Telecommunication ("SWIFT"), with payment of the sender's obligation effected through adjustment of correspondent balances or other means. Payment orders may also be sent by telex or other communications medium. The actual mechanics of performing these transactions varies from bank to bank.

In some cases, a customer may ask his bank to transfer funds from his account and pay another account on the books of the same bank (either another customer's account or a different account of the ordering customer). These are called book transfers because they take place on the books of a single bank. Procedures used to effect these transfers and recordkeeping arrangements vary from bank to bank. Example 5 in U.S. Pat. No. 6,076,074 shows the accounting entries for a book transfer.

D. Paying the Beneficiary

The last step in the process of a finds transfer is paying the beneficiary. In all but a small number of cases, this is accomplished when the beneficiary's bank credits the beneficiary's account on its books and allows the beneficiary use of the funds. Under Federal Reserve Board regulations, a bank must make the proceeds of a funds transfer available to the beneficiary no later than the opening of business on the day after the bank has received final payment. For Fedwire payments, final payment occurs when the amount of the payment order is credited to the receiving bank's account at the Federal Reserve Bank or when notice of the credit is sent, whichever occurs first. For CHIPS transfers, final payment occurs when settlement is completed. For transfers using a correspondent account in which the sender credits the account on its books of the receiving bank (Example 4 in U.S. Pat. No. 6,076,074), final payment occurs when the credit is withdrawn or, if it is not withdrawn, at midnight of the day on which the credit is withdrawable and the receiving bank learns of the fact. Where the receiving bank debits the senders account (Example 3 in U.S. Pat. No. 6,076,074), final payment occurs when the debit is made to the extent the debit is covered by a withdrawable credit in the account.

E. Interbank Settlements

Both of the above-mentioned major funds-transfer systems in the United States provide for settlement, i.e., the actual transfer of value in good funds that results in final payment. Once settlement is accomplished, payments are irrevocable (except in cases of duplicate or erroneous payments). The actual mechanics of the settlement in Fedwire and CHIPS differ, reflecting the differences between a real-time, gross settlement system operated by the central bank and a privately operated real-time final settlement system.

1. Fedwire

From the point of view of a bank that sends a payment order to or receives a payment order from a Federal Reserve Bank, Fedwire funds transfers are final when made. The sender's Federal Reserve Bank debits the sender's account as of the time the Federal Reserve Bank acts on the payment order. The receiving bank receives final payment when its Federal Reserve Bank credits its account or sends an advice of credit, whichever is earlier. At this point, the beneficiary has been paid, and the originator's obligation to pay the beneficiary is discharged. The receiving bank has good funds in its reserve or clearing account that can be withdrawn and that counts towards fulfillment of the bank's required reserve balance.

Viewed from the inside, however, Fedwire is a net settlement system involving 12 settling banks, each of which is a separate corporation with its own balance sheet, and transactions must be settled among these banks. For this purpose, the Federal Reserve Board maintains interdistrict settlement accounts for the Federal Reserve Banks. This account appears on each Federal Reserve Bank's balance sheet. Each transaction between Federal Reserve Banks results in a credit to the interdistrict settlement account of one Federal Reserve Bank and a corresponding debit to the other's. As a result of the accumulated debits and credits, each Federal Reserve Bank has an accumulated position that is either a debit or a credit, and on the consolidated balance sheet of all 12 Federal Reserve Banks, these debits and credits net to zero. Once each year the interdistrict settlement account of each Federal Reserve Bank is brought to zero by the reallocation of the Federal Reserve Bank's ownership interest in the System Open Market Account—the consolidated holdings of all Federal Reserve Banks' government securities.

One disadvantage of Fedwire is that all participants in the system in good standing can incur a large daylight overdraft position. Banks incurring such overdrafts are charged a fee by the Federal Reserve.

2. CHIPS

In contrast, CHIPS is a true real-time final settlement system. As explained above, the release of a payment message creates an obligation to pay the amount of the payment order that is settled in accordance with the system and method described in U.S. Pat. No. 6,076,074.

An earlier version of CHIPS involved an end-of-day, multilateral net settlement system. At the end of each day, each participant received a report showing the total value of all payment messages sent, the total value of all payment messages received, and a net figure (debit or credit) showing the difference. Once the agreement to settle on the basis of the report has been received from each settling participant, the Clearing House would instruct the Federal Reserve Bank of New York to open the CHIPS settlement account that it held on behalf of all CHIPS settling participants and send a notice to all settling participants that settlement could begin. After this notice had been sent, each settling participant that had an aggregate net debit position had 15 minutes to send a Fedwire funds transfer in the amount of its debit position to the CHIPS settlement account at the Federal Reserve Bank of New York (FRBNY). Once all these Fedwires were completed, the Clearing House checked the balance in the account and then sent Fedwire payment orders from the settlement account to the accounts of those settling participants that were in a net credit position. Once all of these Fedwire payment orders had been sent, settlement was complete, and all CHIPS payments made that day were finally paid.

This type of multilateral net settlement system, which provides for settlement at the end of the day, is subject to the risk that a participant with a net debit position (a "debtor participant") would be unwilling or unable to pay its settlement obligation. Absent some measures to make up for the debtor participant's failure, a failure of this kind could mean that the system would fail to settle, which could mean that the finds transfers that were processed by the netting system on the date of the failure would not be completed. Depending on the number and value of the payments handled by the funds-transfer system, such a failure could have serious deleterious effects on the surviving participants and world financial markets generally.

CHIPS took a number of steps to control the risk of a settlement failure. In 1984, it required each of its participants to establish "bilateral credit limits" on each other participant as a measure of the credit risk that it would be willing to accept from the other participant. In 1986, CHIPS took a further step by establishing "sender net debit caps" on each participant as a percentage of the aggregate of the bilateral limits that had been established by other participants. This control limits the amount of risk that a participant can present to the system.

In 1990 CHIPS took the further step of requiring each of its participants to agree to pay a portion of a failed participant's settlement obligation. This "additional settlement obligation" is collateralized by Treasury securities pledged for this purpose and held at FRBNY. This collateralized loss-sharing arrangement assured that CHIPS would be able to settle even if the participant with the highest debit cap were to fail at its greatest possible debit position. (Called the "Lamfalussy Standard" because it was articulated by a working group of the Bank for International Settlements chaired by Alexandre Lamfalussy. CHIPS had in fact anticipated the Lamfalussy Standard and had adopted this risk-control measure before the BIS report had been issued.)

In 1994, CHIPS began to strengthen its existing risk controls so that by 1997 the two banks with the highest debit caps would fail simultaneously with each at its greatest possible debit position, and CHIPS would still be able to settle (referred to as a "Lamfalussy+1 Standard"). The same loss-sharing formula would allow CHIPS to settle if a large number of smaller banks were to fail.

Despite these measures, there remained the risk that a catastrophic financial crisis could result in a settlement failure on CHIPS with the result that all of the payment messages released would have to be "unwound"; i.e., all payment messages be pulled back from the receiving participant and returned to the sending participant, who would be free to decide whether or not the payment should be sent.

To address this risk, CHIPS introduced a system in January 2001 that continuously matches, nets, and releases payment messages on an individual, bilateral, or multilateral basis among participants throughout the day. This system requires each participant to deposit a predetermined amount into a prefunded balance account. Payment messages are not released unless (a) the value of the payment message can be simultaneously charged against and credited to prefunded balances established by each participant; or (b) the payment message can be netted and set off against one or more other payment messages and the resulting balance simultaneously charged against and credited to prefunded balances established by each participant. However, participants are not allowed to make additional deposits to or withdrawals from the prefunded balance account until the system closes for receipt of payment messages at the end of the day. This system greatly reduced the risk of settlement failure due to failure by one or more participants during the business day.

3. German EAF 2 System

A third type of system, which uses elements of both the gross settlement and net settlement systems, is the Electronic Clearing Frankfurt (EAF 2) system, operated in Frankfurt by the Deutsches Bundesbank, the central bank of Germany.

EAF 2's operating day has two phases. In phase 1 (8:00 a.m. to 12:45 p.m.), payment orders received from financial institutions are entered into the system and offset bilaterally, and final payments are available to the recipient credit institution at regular intervals of approximately 20 minutes. These payments are settled as they would be in a gross settlement system. The proceeds of the payment order can thereafter be made available to the beneficiary without credit risk to the receiving bank. In a subsequent phase 2 (1:00 p.m. to 2:15 p.m.), an attempt is made to effect two-stage multilateral clearing of the remaining payments, which have not been netted bilaterally during the first phase. The crucial difference from multilateral clearing, as it exists at present, lies in the avoidance of the systemic risk. If there are uncovered debit balances, no unwinding, involving the exclusion of a participant and the return of all payments associated with the excluded participant, takes place; instead, only individual payments are returned. These individual payments are treated as uncovered payments, as in a gross settlement system.

In phase 1, EAF 2 is very similar to a gross settlement system in which individual payments are executed after cover is available. It is based on the principle that, in bilateral relations, incoming payments are used preferably instead of account balances as cover for outgoing payments, by offsetting them against each other in 20-minute cycles, at which point they become final. The use of liquid funds as working balances, in the form of account balances, is necessary only to a limited extent, compared with a purely gross settlement system, in that the amounts of counter-payments included in the offsetting procedure do not match exactly. In EAF 2, in contrast to a net settlement system, incoming and outgoing payments, which are matched as far as possible, in terms of their amount, are offset against each other. The payments not included in the offsetting procedure are then carried over into queues for the next processing cycle. By contrast, in a net settlement system, a net balance is calculated as the difference between all incoming and outgoing payments, which is settled by debits or credits to an account at the end of day.

In EAF 2 the participants themselves determine how much liquidity or working balances in the form of so-called maximum sender amounts they wish to make available to clear residual differences between the payments included in the offsetting in the particular bilateral relation concerned. In this way, they limit the extent to which they are willing to resort to their own funds, in excess of those received from the counter party. These maximum sender amounts are covered by the transfer of liquidity to a special account of a participant, whose credit balance has been assigned to the bilateral party concerned. Apart from that, the system takes advantage of the high level of two-way payments to conserve liquidity. At the end of phase 1, in order to simplify accounting, all bilateral debit balances of each participant are aggregated into a single overall credit balance, and both overall balances are booked on the giro accounts (a type of German draft account) and the assigned amounts released.

At the beginning of phase 2 (about 1.00 p.m.), there is an initial multilateral clearing process of the payments not settled in phase 1. If debit balances are not covered, the maximum volume of residual payments, which is covered by liquidity on the giro accounts, is calculated on the basis of an algorithm for sorting out individual payments. These residual payments then become final immediately. With the aid of the objective selection criteria predefined by the algorithm, individual payments that have caused the uncovered debit balances are identified. The individual payments that are regarded as uncovered are set aside provisionally pending the execution of the second multilateral clearing, and the revised balances are booked on the Bundesbank giro accounts.

Subsequently, the participants are granted a 45-minute period to acquire cover. Technically, this can be obtained in two different ways: (i) a payment input from the EIL-ZV (the gross settlement system of the Bundesbank) increases the account balance, which is then used to cover the net balances; or (ii) a payment input in the EAF 2 itself (in favor of participants with debit balances) changes the net balances between the participants; the liquidity on the giro accounts remain unchanged.

If net balances arising from the subsequent second multilateral clearing are still uncovered, no unwinding, involving the exclusion of a participant, is performed. Instead, by means of the above-mentioned algorithm, individual payments are now finally withdrawn until the covering funds on the giro accounts are sufficient. Thus the EAF 2 clearing and settlement is always completed, and the systemic risk typical of net settlement procedures is avoided by ruling out an unwinding of a high volume of payments. The individual payments that are treated as uncovered are deemed to be revoked and are not executed. The finality of the payments offset bilaterally in phase 1 and cleared and settled multilaterally in phase 2 is not affected by this. This procedure is also the same as that used in a gross settlement system, where uncovered payments remaining in queues are returned without affecting the finality of payments that have already been executed. Payments that have not been executed can be either entered on the same day into a gross settlement system, such as the German EIL-ZV system, whose operating hours may be extended slightly for this reason, or re-entered in EAF 2 the following day.

The EAF 2 system has several drawbacks. For one thing, although final settlement occurs throughout the day, the occurrences are at 20 minute intervals. Also, although the system allows prefunded accounts to be set up by individual institutions, each account is created for use in offsetting payments to a preselected financial institution. For example, Bank A may set up an account for offsetting payments and receipts vis-à-vis Bank B, and only Bank B, and another account for Bank A's relations with Bank C, and so on.

By contrast, CHIPS provides continuous intraday final settlement of payments by means of prefunded accounts of participating financial institutions that are used to offset payments and receipts as against all other participants. Under the CHIPS rules, each participant is required to deposit a predetermined amount into the prefunded balance account. This deposit is recorded on CHIPS's books as the participant's "opening position" or "initial prefunded balance." As each payment message is released (whether individually or in bilateral or multilateral batches), the amount of the payment message is subtracted from the position of the sending participant and added to the position of the receiving participant. The intraday record of each participant's opening position, adjusted to reflect these increases and decreases, is referred to as its "current position." Participants are not permitted to make additional deposits to or withdrawals from the prefunded balance account during the day until the system has closed for receipt of payment messages.

The release of payment messages is controlled by a computer program (the "balanced release algorithm") to ensure that no participant's current position is ever less than zero or more than twice its opening position. These boundaries require some payment messages, especially higher value payment messages, to be held in a queue, because they could not be released without causing either the sending participant's or the receiving participant's current position to fall outside of their current-position boundaries. Nevertheless, the balanced release algorithm is extraordinarily efficient.

Still, the experience has been that a few very large payment messages may be held by the balanced release algorithm for 30 minutes or more, and that these delays can be of concern to participants and their customers. In addition, the operation of the balanced release algorithm does not clear all payment messages before the end-of-day close, requiring a final prefunding phase to settle and release any payment messages that remain unreleased.

Given this background, what is needed is a system and method for allowing banks to supplement their prefunded balance account with intraday supplemental funding. This supplemental funding would permit banks to allow large payment messages to be processed quickly, which in turn should reduce the size of the final prefunding requirements at the end of the day.

SUMMARY OF THE INVENTION

In one aspect of the present invention, a system, method, and computer code are provided for continuous intraday final settlement of payment orders among a number of participants, each participant having facilities configured to electronically send and receive the payment orders in the form of payment messages. Primary and supplemental positions are stored, the positions corresponding to balances in a prefunded balance account and representing a right of one of the participants to payment from the prefunded balance account. Payment messages are received from sending participants. A determination is made, for at least one selected payment message, as to whether the supplemental position of a sending participant of the selected payment message, after subtraction of a payment amount of the selected payment message, is greater than or equal to a predetermined minimum for the sending participant's supplemental position. A determination is made as to whether the supplemental position of a receiving participant of the selected payment message, after addition of the payment amount, is less than or equal to a predetermined maximum for the receiving participant's supplemental position.

This aspect further includes releasing the payment message, such that the sending participant's supplemental position is decreased by the payment amount and the receiving participant's supplemental position is increased by the payment amount, if it is determined that: (i) the sending participant's supplemental position, after subtraction of the payment amount, is greater than or equal to the predetermined minimum for the sending participant's supplemental position, and (ii) the receiving participant's supplemental position, after addition of the payment amount, is less than or equal to the predetermined maximum for the receiving participant's supplemental position.

Embodiments of the present invention may include one or more of the following features. If it is determined that the sending participant's supplemental position, after subtraction of the payment amount, is less than the predetermined minimum for the sending participant's supplemental position, then the payment amount may be divided into a primary payment portion and a supplemental payment portion, such that the sending participant's supplemental position, after subtraction of the supplemental payment portion, is greater than or equal to the predetermined minimum for the sending participant's supplemental position. A determination may be made as to whether the sending participant's primary position, after subtraction of the primary payment portion, is greater than or equal to a predetermined minimum for the sending participant's primary position. A determination may be made as to whether the receiving participant's primary position, after addition of the primary payment portion, is less than or equal to a predetermined maximum for the receiving participant's primary position.

Additionally, the payment message may be released, such that the sending participant's primary position is decreased by the primary payment portion and the receiving participant's primary position is increased by the primary payment portion, and the sending participant's supplemental position is decreased by the supplemental payment portion and the receiving participant's supplemental position is increased by the supplemental payment portion, if it is determined that: (i) the sending participant's primary position, after subtraction of the primary payment portion, is greater than or equal to the predetermined minimum for the sending participant's primary position, and (ii) the receiving participant's primary position, after addition of the primary payment portion, is less than or equal to the predetermined maximum for the receiving participant's primary position.

A payment messages may be designated as a priority message, and a participant may be allowed to reserve a portion of the participant's supplemental position for payment of priority payment messages.

In another aspect of the present invention, a system, method, and computer code are provided for continuous intraday final settlement of payment orders among a number of participants, each participant having facilities configured to electronically send and receive the payment orders in the form of payment messages. Primary and supplemental positions are stored, the positions corresponding to balances in a prefunded balance account and representing a right of one of the participants to payment from the prefunded balance account. Payment messages are received from sending participants. Designation of at least one of the payment messages as a priority message is accepted. A determination is made, for a selected priority payment message, as to whether the sending participant's supplemental position, after subtraction of a payment amount of the selected priority payment message, is greater than or equal to a predetermined minimum for the sending participant's supplemental position. The priority payment message is released, such that the sending participant's supplemental position is decreased by the payment amount and the receiving participant's supplemental position is increased by the payment amount, if it is determined that the sending participant's supplemental position, after subtraction of the payment amount, is greater than or equal to the predetermined minimum for the sending participant's supplemental position.

Embodiments of the present invention may include one or more of the following features. The sending participant may be allowed to reserve a portion of the sending participant's supplemental position for payment of priority payment messages. A determination may be made, for a selected non-priority payment message, as to whether the sending participant's supplemental position, excluding the reserved portion, after subtraction of a payment amount of the selected non-priority payment message is greater than or equal to the predetermined minimum for the sending participant's supplemental position. A determination may be made, for the selected non-priority payment message, as to whether the supplemental position of a receiving participant of the selected non-priority payment message, after addition of the payment amount, is less than or equal to a predetermined maximum for the receiving participant's supplemental position. The non-priority payment message may be released, such that the sending participant's supplemental position is decreased by the payment amount and the receiving participant's supplemental position is increased by the payment amount, if it is determined that: (i) the sending participant's supplemental position, excluding the reserved portion, after subtraction of the payment amount is greater than or equal to the predetermined minimum for the sending participant's supplemental position, and (ii) the supplemental position of the receiving participant of the selected non-priority payment message, after addition of the payment amount, is less than or equal to a predetermined maximum for the receiving participant's supplemental position.

Priority payment messages may be categorized in one of at least two categories of priority, and all of the priority payment messages in the first category may be selected for release before selection of any of the priority payment messages in the second category.

In another aspect of the present invention, a system, method, and computer code are provided for continuous intraday final settlement of payment orders among a plurality of participants, each participant having facilities configured to electronically send and receive the payment orders in the form of payment messages. Primary and supplemental positions are stored, the positions corresponding to balances in a prefunded balance account and representing a right of one of the participants to payment from the prefunded balance account. Payment messages are received from participants. At least two of the payment messages are combined to form a batch, which results in position changes for the primary position and the supplemental position of each participant in the batch.

Each of the payment messages of the batch is selected such that: (i) the combined primary and supplemental position of each participant in the batch changes by the sum of payments received by that participant minus the sum of payments sent by that participant; (ii) for all of the participants in the batch, the sum of all primary position changes is zero, and the sum of all supplemental position changes is zero; (iii) the primary position of each participant in the batch is within predetermined primary position limits for that participant; (iv) the supplemental position of each participant within the batch is non-negative; (v) the supplemental position of each participant in the batch is less than a predetermined maximum supplemental position, except that the supplemental position of a participant may exceed that participant's maximum supplemental position if: (a) the participant is the receiving participant of the selected payment message, (b) the selected payment message is a priority message, and (c) the participant's supplemental position change is no more than an amount of the payment message. The batch of payment messages is released if and only if the batch meets conditions (i) through (v).

Embodiments of the present invention may include the feature that each payment message of the batch is selected on a trial basis and added to the batch if and only if conditions (i) through (v) are met.

In another aspect of the present invention, a system, method, and computer code are provided for end-of-day final settlement of payment orders among a number of participants, each participant having facilities configured to electronically send and receive the payment orders in the form of payment messages. Primary and supplemental positions are stored, the positions corresponding to balances in a prefunded balance account and representing a right of one of the participants to payment from the prefunded balance account. Payment messages are received from sending participants. At least one of the payment messages is retained as an end-of-day unreleased payment message. The primary positions for each participant are combined with the corresponding supplemental position for each participant to form a combined position. A determination is made, for each unreleased payment message, as to whether the sending participant's combined position, after subtraction of a payment amount of the unreleased payment message, is greater than or equal to a predetermined minimum for the sending participant's combined position. Each of the unreleased payment messages is released, such that the sending participant's combined position is decreased by the payment amount and the receiving participant's combined position is increased by the payment amount, if it is determined that the sending participant's combined position, after subtraction of the payment amount of the unreleased payment message, is greater than or equal to the predetermined minimum for the sending participant's combined position.

Embodiments of the present invention may include one or more of the following features. A multilateral net balance may be calculated for each participant based on any messages remaining after the releasing of the unreleased payment messages. Each participant's multilateral net balance may be combined with each participant's combined position to determine each participant's closing position. Payment may be required from each participant for which the closing position is less than zero.

Additionally, all payment messages from sending participants who have paid their closing position may be released, and any remaining payment messages may be cancelled. Funds may be transferred from the prefunded balance account to each participant based on their closing position.

These and other objects, features and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

FIG. 5 is a flowchart showing the end-of-day closing procedure.

DETAILED DESCRIPTION OF THE PREFERRED EMBODIMENTS

Figure 1:
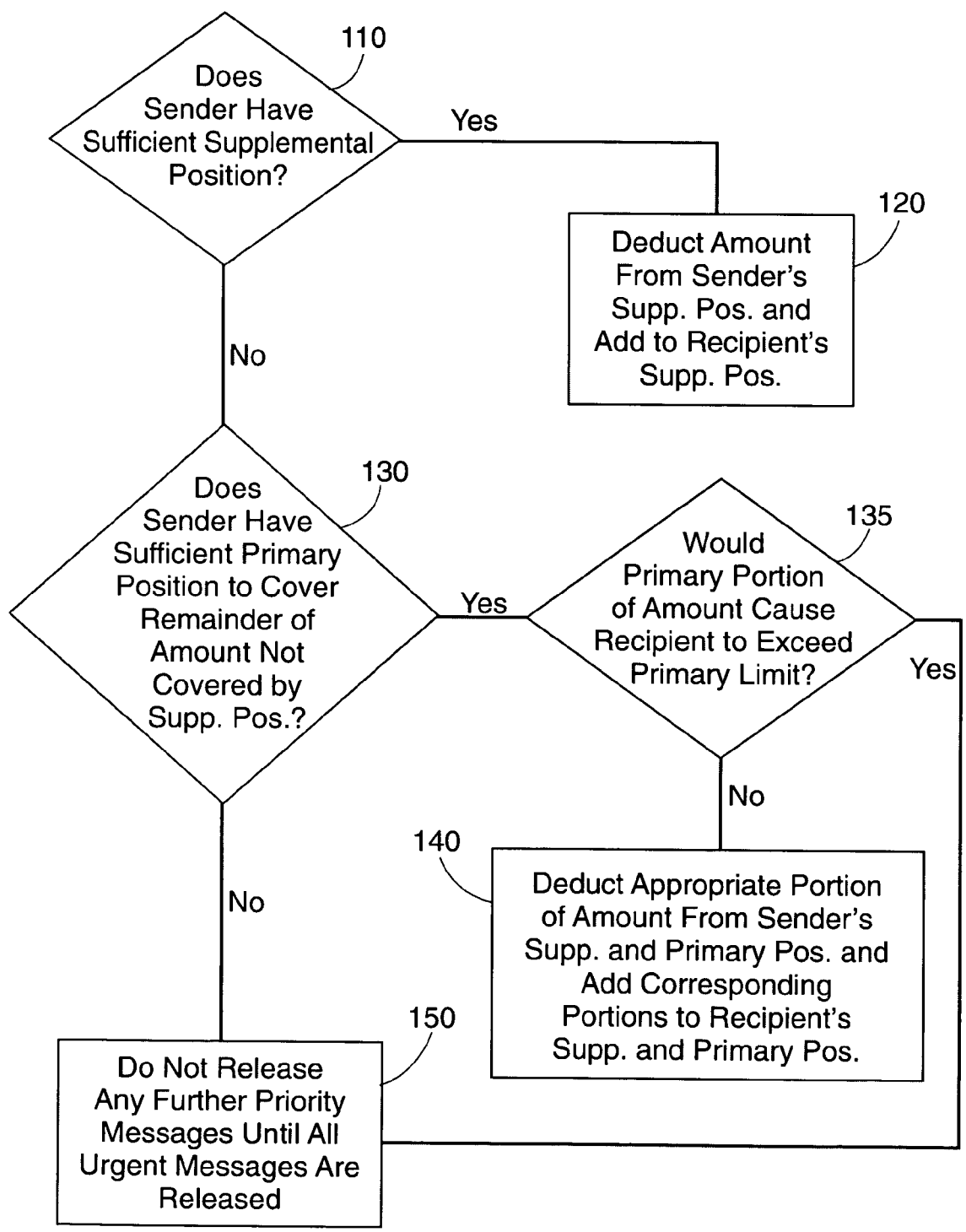
FIG. 1 is a flow chart showing the procedure for releasing urgent and preferred payment messages in a system including supplemental funding.

In accordance with the present invention, each CHIPS participant is required to deposit a predetermined amount into a prefunded balance account (the participant's "opening position" or "initial prefunded balance"), which is a special deposit account established at the Federal Reserve Bank of New York (FRBNY) to hold a balance pursuant to the CHIPS Prefunded Balance Account Agreement. This agreement, dated Aug. 28, 2000, was entered into by the Clearing House (then The Clearing House Interbank Payments Company L.L.C.) as agent on behalf of all funding participants and the Federal Reserve Bank of New York. In accordance with the present invention, after each participant has transferred its opening position requirement, it is permitted to transfer additional funds to the prefunded balance account. There is no limit on the amount that a participant can add as supplemental prefunding, and participants are able to add supplemental funds throughout the day until the end-of-day closing procedure begins. This supplemental funding represents an improvement upon the System and Method for Intraday Netting Payment Finality disclosed in U.S. Pat. No. 6,076,074, which, as noted above, is incorporated herein in its entirety by reference.

I. Overview of Operational Procedures

Under the operational procedures for supplemental funding, CHIPS records any supplemental transfer by a participant and records any increases or decreases to this initial supplemental position as payment messages are sent and received (a "payment message" is an electronic message, which when released by CHIPS, instructs a receiving participant to pay, or cause another bank to pay, a fixed amount of money to a beneficiary, which may be the receiving participant itself, the sending participant itself, or a third party). CHIPS keeps separate records of each bank's: (i) opening position (hereafter referred to as its "opening primary position") and any increases or decreases to the required opening position resulting from sending or receiving payments messages (hereinafter referred to as its "current primary position"); (ii) any intraday addition to the prefunded balance account ("initial supplemental position"), including any increases or decreases to the supplemental position resulting from sending or receiving payment messages and any voluntary additions to or withdrawals of a supplemental position (the supplemental position, including these increases and decreases, is hereinafter referred to as the "current supplemental position"); and (iii) a "combined position," which is the sum of the current primary position and the current supplemental position.

A participant is also permitted to designate any payment message as "urgent" or "preferred." The balanced release algorithm, which is discussed in further detail below, releases urgent payment messages before preferred messages and releases preferred payment messages before payment messages that have not been designated as urgent or preferred ("non-priority payment messages"). Urgent and preferred payment messages are sent to a receiving participant without regard to any maximum position limits on the receiving participant. A participant is permitted to designate any or all of its supplemental transfers as a "reserved supplemental position" to be used exclusively for the settlement and release of its urgent and preferred payment messages.

CHIPS administers a limit on the amount of liquidity that a receiving participant can accumulate (its "maximum current supplemental position"). The maximum current supplemental position limits only the size that the current supplemental position can reach through the receipt of non-priority payment messages—the receipt of urgent and preferred payment messages are not affected by this limit.

The balanced release algorithm processes a sending participant's payment messages in the following order of priority: urgent payment messages, preferred payment messages, non-priority payment messages. For receiving participants, the balanced release algorithm settles and releases all urgent and preferred payment messages without regard to any limit on the receiving participant's positions. A non-priority payment message is not released if its receipt would cause the receiving participant to exceed its maximum current primary position or its maximum current supplemental position.

Until closing for delivery of new payment messages, CHIPS maintains a separate record of each participant's current primary position and current supplemental position. When a payment message is individually settled by deducting an amount from the sending participant's current primary position, the receiving participant's current primary position is increased by an identical amount. Likewise, when a payment message is individually settled by deducting an amount from the sending participant's current supplemental position, the receiving participant's current supplemental position is increased by an identical amount. Thus, both accounts (primary and supplemental) may be used to affect the release of particular payment. The balanced release algorithm ensures that neither of these positions ever goes below zero and that the maximum limits on these positions are not breached.

The sum of a participant's current primary position and its current supplemental position is its "combined position." Because it is the sum of two non-negative numbers, the combined position can never go below zero until the end-of-day closing procedure commences. At that point, CHIPS combines the primary and supplemental positions into the combined position and stops maintaining account of separate primary and supplemental positions. From that point on, the end-of-day closing procedure proceeds normally. At the conclusion of the initial closing, netting, and release phase, a participant's combined position may be a negative number, in which case it is the participant's "closing position requirement," which must be paid if all payments remaining in the queue are to be settled and released through CHIPS.

A participant is not permitted to withdraw funds from the prefunded balance account with respect to its current primary position. However, a participant may withdraw that portion of the current supplemental position that is less than or equal to the amount of supplemental transfers it made to the prefunded balance account. For example, if a participant makes $1 million in supplemental transfers and sends out payment messages that are settled in whole or in part by reducing its current supplemental position by $1 million, and then the participant receives payment messages that result in an increase to its current supplemental position of $2.5 million, it would be able to withdraw no more than $1 million from the prefunded balance account. On the other hand, a participant that made no supplemental payments and received payment messages resulting in a $2.5 million addition to its current supplemental position would not be able to withdraw any funds from the prefunded balance account. Such a participant would, however, be able to send payment messages that would be settled by reducing its current supplemental position.

II. Overview of Supplemental Funding

As discussed above, supplemental funding is offered by CHIPS to address the release of certain types of payment messages. However, this feature is optional, and participants can choose whether or not to implement supplemental funding based on operational considerations. While, as noted above, most payment messages are released in a timely manner, certain payment messages may remain queued in CHIPS longer than is thought desirable by participants. Supplemental funding facilitates prompt payment message release by allowing a participant to exercise more direct control over its own payment messages that have yet to be sent to or released by CHIPS, while still retaining the economic benefits afforded by CHIPS Finality.

Supplemental funding allows a participant to add funds to CHIPS throughout the day to cause a controlled release of certain types of unreleased payment messages. After providing its initial prefunding balance requirement to CHIPS, a participant can provide supplemental funding at any time throughout the day. There is no limit as to the amount or frequency of supplemental funding that a participant may send to the CHIPS prefunded balance account.

Supplemental funding consists of a Fedwire funds-transfer payment order that identifies the participant for whom the payment order is submitted, and specifies, within the Fedwire payment order, that the funds are for supplemental funding. Any supplemental funding received for a participant that has yet to provide its opening position is returned to the originator of the Fedwire payment order. In addition, any Fedwire payment order that cannot be identified as supplemental funding is returned to the originator of the Fedwire payment order.

As payment messages are released by CHIPS, the participants' available balances increase and decrease. As discussed above, the balance derived from the initial prefunding balance requirement is referred to as the participant's current or primary position. The balance derived from supplemental funding is referred to as the participant's supplemental position. A portion or all of a participant's supplemental position may be reserved for payment messages that have been identified as a priority payment messages by a participant, e.g., identified as "urgent" or "preferred." Each day, at the CHIPS cutoff time, each participant's supplemental position is used during the final release process and applied to the final net balances for the final prefunding balance requirements.

A participant can withdraw up to the amount of supplemental funds that it has added to the CHIPS prefunded balance account, as long as those funds are available at the time CHIPS acts upon the instruction. However, if a participant has accumulated supplemental funds in excess of the amount that it has added, the participant may withdraw only an amount that is less than or equal to the amount that it added. CHIPS initiates, from the prefunded balance account, a Fedwire payment order to the participant that has requested a withdrawal from its supplemental position. The payment order is sent in accordance with pre-arranged instructions, established between the participant and CHIPS, for returning funds at the end of the day.

To control the release of certain types of payment messages, a participant may use: (i) the existing CHIPS payment message preference flag; (ii) a new category of the payment message preference flag; or (iii) a new command to reserve some or all of its supplemental position to be used exclusively for releasing payment messages that have been marked with a preference flag. A payment message may be designated "non-priority," "preferred," or "urgent." Payment messages that are marked preferred or urgent are released if the sending participant has a sufficient supplemental position, regardless of a receiving participant's supplemental position absorption limit.

Payment messages that are marked preferred or urgent are released in order of their priority. For example, if a participant has one urgent and one preferred payment message, the urgent payment message is released first. If there are enough funds to release the preferred payment message, but not enough for the urgent payment message, neither payment message is released. In such case, the sending participant could mark the preferred payment message as urgent and the payment message would then be released.

The procedure for releasing individual urgent and preferred payment messages is shown in FIG. 1. In general, finds from both the primary and supplemental accounts may be used. The sending participant's full supplemental account position is available to release the sending participant's payment of highest priority. In addition, that part of the sending participant's primary account position that does not exceed the difference between the receiving participant's primary maximum position and the receiving participant's primary actual position, is also available. If the payment amount is no greater than the sum of these available amounts from the sending participant's respective accounts, the payment is released. The system chooses a suitable division of funds from the two accounts totaling the payment amount, and these partial amounts are transferred to the respective accounts of the receiving participant. That is, the sending participant's accounts are debited and the receiving participant's corresponding accounts are credited. If the payment amount is greater than the sum of the available funds, as described above, the payment is not released.

First, the system determines whether the sending participant has a sufficient supplemental position to cover the amount of the payment message (Step 110), i.e., whether releasing the payment message would not cause the sending participant's current supplemental position to go below zero. If so, the amount of the payment message is deducted from the sending participant's supplemental position and added to the receiving participant's supplemental position (Step 120). If the sending participant does not have a sufficient supplemental position, the system determines whether the sending participant's primary position is sufficient to cover the remainder of the amount not covered by the sending participant's supplemental position (Step 130). If the sending participant's primary position is sufficient to cover the remainder of the amount, then the system determines whether releasing the payment message would cause the receiving participant to exceed its primary limit (Step 135), i.e., whether adding the portion of the amount covered by the sending participant's primary position to the receiving participant's primary position would cause it to exceed its maximum limit. If the receiving participant's primary limit would not be exceeded, then the primary portion of the payment amount (i.e., that portion covered by the sending participant's primary position) is deducted from the sending participant's primary position and added to the receiving participant's primary position, and the supplemental portion of the amount is deducted from the sending participant's supplemental position and added to the receiving participant's supplemental position (Step 140).

If the system determines that the sending participant's primary position is not sufficient to cover the remainder of the amount not covered by the sending participant's supplemental position (Step 130), then the system attempts to release other urgent payment messages, if any. However, none of a sending participant's reserved supplemental funds are used to release preferred payment messages until all of its urgent payment messages have been released (Step 150). Likewise, if the system determines that releasing the payment message would cause the receiving participant to exceed its primary limit (Step 135), then message in question is not released.

Payment messages that have the same preference flag designation are released in system sequence number (SSN) order, i.e., the order in which the payment messages were received by the system, when possible. However, a smaller sized payment message is not blocked by a larger payment message with the same preference. If a participant's position is not sufficient to release an older, larger payment message, but is sufficient to release a newer, smaller payment message, the newer payment message is released first.

As noted above, a participant's supplemental position is tracked separately from its primary position. If a sending participant sends a payment message that is settled by deducting all or part of the amount of the payment message from the participant's supplemental position, the amount is added to the receiving participant's supplemental position. Therefore, a participant can have a supplemental position even if it has not sent any supplemental finding to the CHIPS prefunded balance account. The total amount in the prefunded balance account, i.e., the total for all participants, does not change with the release and settlement of a payment message. Likewise, the total amount in the prefunded balance account devoted to the primary account positions of the participants does not change with the release and settlement of a payment message, and consequently, the same is true for the supplemental account positions.

CHIPS attempts to release a participant's non-priority payment messages using its supplemental position, provided the following criteria are satisfied: (i) only the excess of the supplemental position over the reserved amount is used; and (ii) the receiving participant does not exceed its supplemental funding credit cap for receiving non-priority payment messages.

Figure 2:
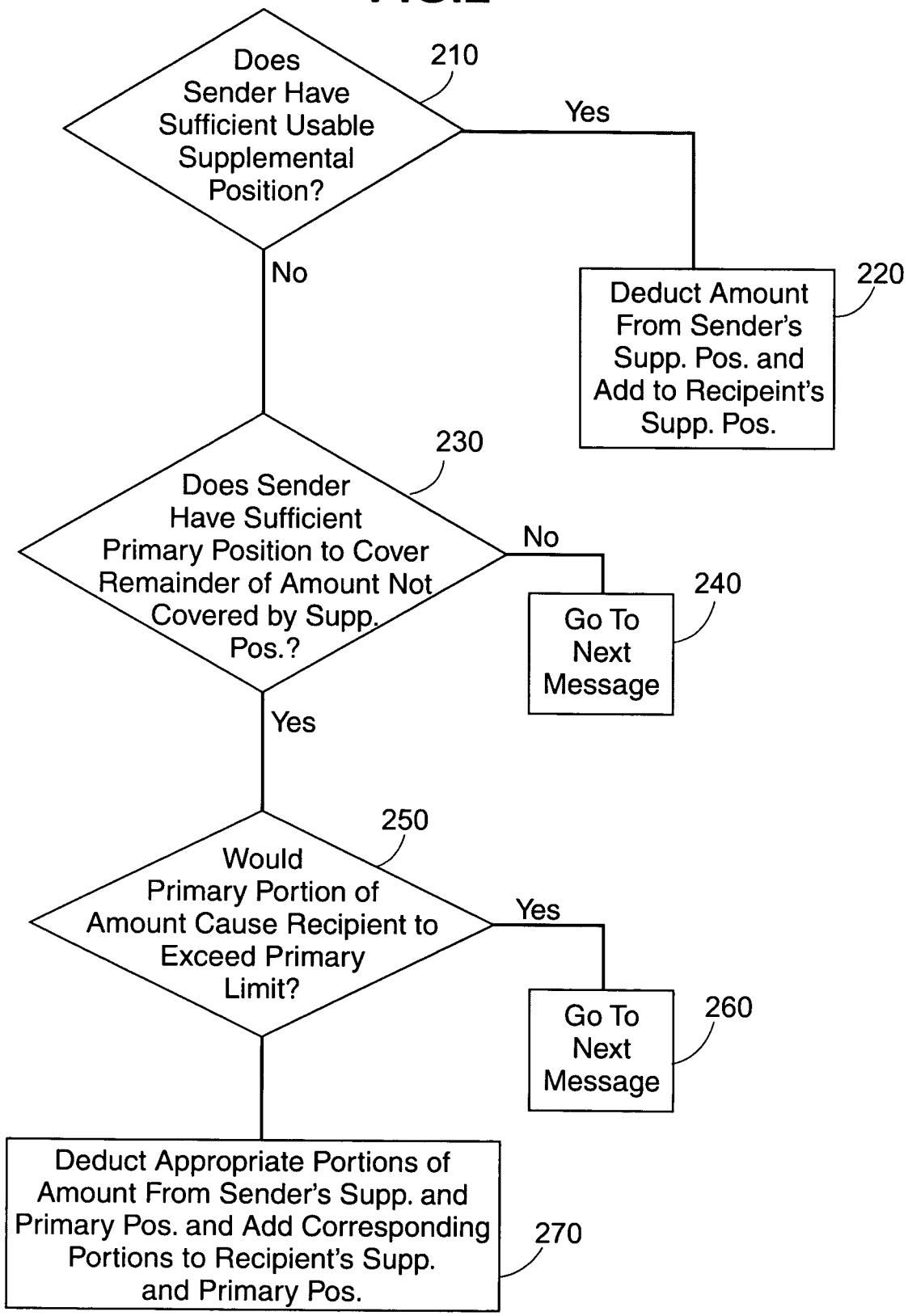
FIG. 2 is a flow chart showing the procedure for releasing non-priority payment messages in a system including supplemental funding.

The procedure for releasing non-priority payment messages is shown in FIG. 2. In general, maximum positions are observed for both the receiving participant's supplemental and primary positions. In addition, only the excess of the sending participant's supplemental position, over any reserved amount, is available for use. For each account, primary and supplemental, only that part of the sending participant's available position that does not exceed the difference between the receiving participant's maximum position and its respective actual position is available to affect the release of a payment. If the payment amount is no greater than the sum of the amounts thus available in each of the sending participant's two accounts, then release occurs—otherwise not. The system chooses a suitable division of funds from the sending participant's two accounts totaling the payment amount, and these partial amounts are transferred to the respective accounts of the receiving participant (i.e., the sending participant's accounts are debited and the receiving participant's accounts are credited).

First, the system determines the sending participant's usable supplemental position (Step 210). As discussed above, a portion of the sending participant's supplemental position may be reserved for priority payment messages, so this reserved amount is subtracted from the sending participant's supplemental position. The lesser of this difference and the amount by which the receiving participant's maximum supplemental position exceeds its current supplemental position is taken to be the usable supplemental position of the sending participant (by contrast, urgent and preferred payment messages are sent without regard to the receiving participant's maximum supplemental position). If this usable supplemental position is greater than or equal to the payment amount, then the payment is released, and the payment amount is deducted from the sending participant's supplemental position and added to the receiving participant's supplemental position (Step 220).

If the sending participant's usable supplemental position, as determined above, is not sufficient, then the system determines whether the sending participant's primary position is sufficient to cover the remainder of the payment amount not covered by the sending participant's usable supplemental position (Step 230). If the sending participant does not have a sufficient primary position to cover the remainder of the payment amount, then the payment message is not released, and the system attempts to release the next payment message in the queue (Step 240).

If the sending participant does have a sufficient primary position, then the system determines whether the primary portion of the payment message (i.e., that portion covered by the sending participant's primary position) would cause the receiving participant to exceed the receiving participant's maximum primary position (Step 250). If so, then the payment message is not sent, and the system attempts to release the next payment message in the queue (Step 260).

If the primary portion of the payment message would not cause the receiving participant to exceed the receiving participant's maximum primary position (Step 250), then the primary portion of the amount is deducted from the sending participant's primary position and added to the receiving participant's primary position, and the supplemental portion of the amount is deducted from the sending participant's supplemental position and added to the receiving participant's supplemental position (Step 270).

As discussed in further detail below, CHIPS also releases payments in batches, e.g., when payments are deemed to be too large for individual release. This batching process is also discussed in U.S. Pat. No. 6,046,074, which has been incorporated by reference. In forming batches, the flow of funds between primary and supplementary accounts is less constrained than in the case of individual payment releases. The situation may be described in terms of the multiple constraints observed by CHIPS in building a batch to release. Each batch consists of one "target" payment and one or more "helper" payments. The constraints are these: (1) the combined balance of each participant involved in a batch increases by the sum of the payments it receives minus the sum of the payments it sends within the batch; (2) among the participants involved in a batch, the sum of all of the primary account changes is zero, and the sum of all of the supplementary account changes is zero; (3) all primary account limits hold upon release of the batch; (4) supplemental accounts are non-negative upon release of the batch; and (5) if a supplemental position meets or exceeds its maximum position after the batch release, then that balance may have been increased by the batch only if (a) the target payment of the batch is marked either "preferred" or "urgent" and (b) the balance belongs to the receiving participant of the target payment. In such a case, the balance increase may be no more than the amount of the target payment.

In forming tentative batches of payments, the method adopted above for individual payments, whereby a payment amount is divided into primary and supplemental portions, is adopted in a relaxed form in accord with the prior paragraph. Specifically, additional payment flows are permitted between the primary and supplemental accounts of the sending and receiving participants. The latter payment flows must sum to zero in a completed batch. This approach permits a more optimum and robust use of supplemental funds.

In order to keep the balanced release algorithm from allowing a participant to absorb excessive liquidity from supplemental funding with non-priority payment messages, CHIPS calculates for each participant a "maximum current supplemental position" in accordance with a formula that is reasonably designed to facilitate the CHIPS payment message release methodology. In one embodiment, this credit cap is derived from a formula based upon the participant's initial prefunding balance requirement. The supplemental funding credit cap of a participant is equal to the total supplemental funding held by CHIPS at the time of the calculation, multiplied by a fraction. The numerator of this fraction is the actual initial prefunding balance requirement for the participant, held by CHIPS at the time of the calculation. The denominator is the sum of the initial prefunding balance requirements for all participants, expected by CHIPS on the business day.

This amount may be expressed as follows:

$$SFCC = TSF * \frac{IPBR}{TIPBR}$$

Where:
SFCC = Supplemental funding credit cap of a participant at the time of the calculation
TSF = Total supplemental funding held by CHIPS at the time of the calculation
IPBR = Participant's initial prefunding balance requirement held by CHIPS at the time of the calculation
TIPBR = Total of all initial prefunding balance requirements expected by CHIPS on the business day For example, if:

$$IPBR = \$10\ M$$
$$TIPBR = \$2{,}525\ B$$
$$TSF = \$600\ M$$

$$SFCC = \$600\ M * \frac{\$10\ M}{\$2{,}525B}$$

then:
$$SFCC = \$2.376\ M$$

This calculation is used to determine the maximum amount a participant can absorb in its supplemental position by receiving non-priority payment messages. As the total of supplemental funds held by CHIPS increases and decreases during the business day, each participant's supplemental funding credit cap is adjusted accordingly.

A participants has the ability to control the use of its supplemental position by reserving a specified amount to be used only for urgent and preferred payment messages. CHIPS uses the unreserved amount of a participant's supplemental position for release of any payment messages, though payment priority affects the order in which payment message releases are attempted. A participant may specify a reserve amount of supplemental funds that it has already sent to the prefunded balance account or that it intends to send to the prefunded balance account according to the following rules:
1. A participant may reserve an amount at any time and may alter it at any time during the business day;
2. The reserve amount is reset to zero at the start of each business day;
3. The reserve amount is used by CHIPS to determine the amount of the participant's supplemental position available for the release of non-priority payment messages; and
4. As stated earlier, a participant may specify a reserve amount of supplemental funds that it has already sent to CHIPS or intends to send to CHIPS.

In practice, CHIPS reserves a supplemental funds amount that is the smaller of either the specified reserve amount or the actual net supplemental funding amount that the participant has added to the CHIPS prefunded balance account, where the net amount includes its supplemental deposits minus its supplemental withdrawals. As discussed above, if a participant has urgent and preferred payment messages, its supplemental position is not be used to release the preferred payment messages until all of the urgent payment messages are released.

The Clearing House, as agent of all funding participants, maintains an account at the Federal Reserve Bank of New York to receive funding payments for CHIPS processing. All payments made for initial, supplemental, and final prefunding are made individually for each participant, and any participant that funds for one or more other participants must send separate Fedwire payment orders for each participant, identifying the participant that is being funded (these rules apply for initial, supplemental, and final prefunding). While a non-funding institution (i.e., a participant that has not become a party to the CHIPS Prefunded Balance Account Agreement) is typically funded by a designated funding participant, funding is not restricted to the designated funding participant. A participant may be funded by another institution on Fedwire as long as the CHIPS participant is correctly identified.

A receiving participant's routing number is kept on file at CHIPS to designate where the outgoing end-of-day, and withdrawals of supplemental funding, payments are to be sent. In addition, an optional demand deposit account ("DDA") number is kept on file to designate an account at the receiving participant. All Fedwire payments must be settlement type 16 message payments. For initial and final payments, all Fedwire payments made for CHIPS prefunding purposes must identify the participant that is being funded in the Originator Tag as follows:

{5000}C<CHIPS 4 digit ABA#>*<ABA name>*

The FI-to-FI tag {6500} must also be used to specify whether the payment is for initial or final pre-funding. For example, an initial pre-funded message for participant 0004 would be formatted as follows:

{5000}C0004*BANK 0004 NAME*{6500}*CHIPS INITIAL PREFUNDED*BALANCE REQUIREMENT

An example of a final prefunded message for participant 0004 would be:

{5000}C0004*BANK 0004 NAME*{6500} CHIPS FINAL PREFUNDED*BALANCE REQUIREMENT*

For supplemental funding, all Fedwire payments made for CHIPS prefunding purposes again must identify the participant that is being funded in the Originator Tag as follows:

{5000}C<CHIPS 4 digit ABA#>*<ABA name>*

The FI-to-FI tag {6500} must also be used to specify that the payment is for supplemental funding. The token "SUPPLEMENTAL" or "ADDITIONAL" must be present on the first line of this tag. An example of a supplemental prefunded message for participant 0004 would be:

{5000}C0004*BANK 0004 NAME*{6500} CHIPS SUPPLEMENTAL FUNDING* or

{5000} C0004*BANK 0004 NAME*{6500} CHIPS ADDITIONAL FUNDING*

For outgoing payments, CHIPS uses the receiving financial institution and the optional DDA number in the Beneficiary Tag as follows:

{4200}C<CHIPS 4 digit ABA#>*<ABA name>* or

{4200}D<DDA account# on file>*<CHIPS 4 digit ABA#> <space> <ABA name>*

The FI-to-FI tag is formatted as follows:

{6500} CHIPS END OF DAY*FINAL AVAILABLE BALANCE*

An example of an end of day payment with DDA for participant 0999 would be:

{4200}D009999999912*0999 BANK NAME 0999{6500} CHIPS END OF DAY*FINAL AVAILABLE BALANCE*

For withdrawal payments, CHIPS uses the receiving financial institution and the optional DDA number in the Beneficiary Tag as follows:

{4200}C<CHIPS 4 digit ABA#>*<ABA name>* or
{4200}D<DDA account# on file>*<CHIPS 4 digit ABA#><space><ABA name>*

The FI to FI tag is formatted as follows:

{6500}WITHDRAWAL OF SUPPLEMENTAL FUNDING*

An example of an end of day payment with DDA for participant 0999 would be:

{4200}D009999999912*0999 BANK NAME 0999{6500}WITHDRAWAL OF SUPPLEMENTAL FUNDING*

Fedwire payment orders that are received and cannot be identified, or result in an over-payment of funding, are returned as a Fedwire reversal. The FI-to-FI contains information regarding the reason for the reversal. For example:

{6500}RETURN OF EXCESS INITIAL*PREFUNDED BALANCE*

Or, when returning supplemental funds to a participant that has not yet funded:

{6500}RETURN OF SUPPLEMENTAL FUNDING*PARTICIPANT NOT FUNDED*

III. System Hardware

The system of the present invention includes a central controlling agent having a central computer that is structured to communicate with participating financial institutions. The system has hardware and software to control and update prefunded balance accounts associated with the participating financial institutions, and, by means of crediting and debiting these accounts within predetermined constraints, the system controls release and settlement of payments between and among the participating institutions. The system preferably is implemented with a computer system having the ability to communicate electronically with banks, including the participating financial institutions as well as the Federal Reserve Bank that is holding the prefunded balance account, and having storage capacity sufficient to maintain queues for temporarily storing payment orders received by banks until the associated payments can be released.

The system may be implemented using certain aspects of the current CHIPS system hardware. However, when implemented using CHIPS hardware, the system achieves an improvement over the current CHIPS implementation by allowing supplemental funding. The system of the present invention is not limited to this implementation, however, and may be implemented using hardware and software independent of and different from that utilized in the current CHIPS system. A detailed description of the current CHIPS system can be found in the CHIPS Systems and Operations Manual, published by The Clearing House Payments Company L.L.C., which is incorporated herein by reference.

Figure 3:
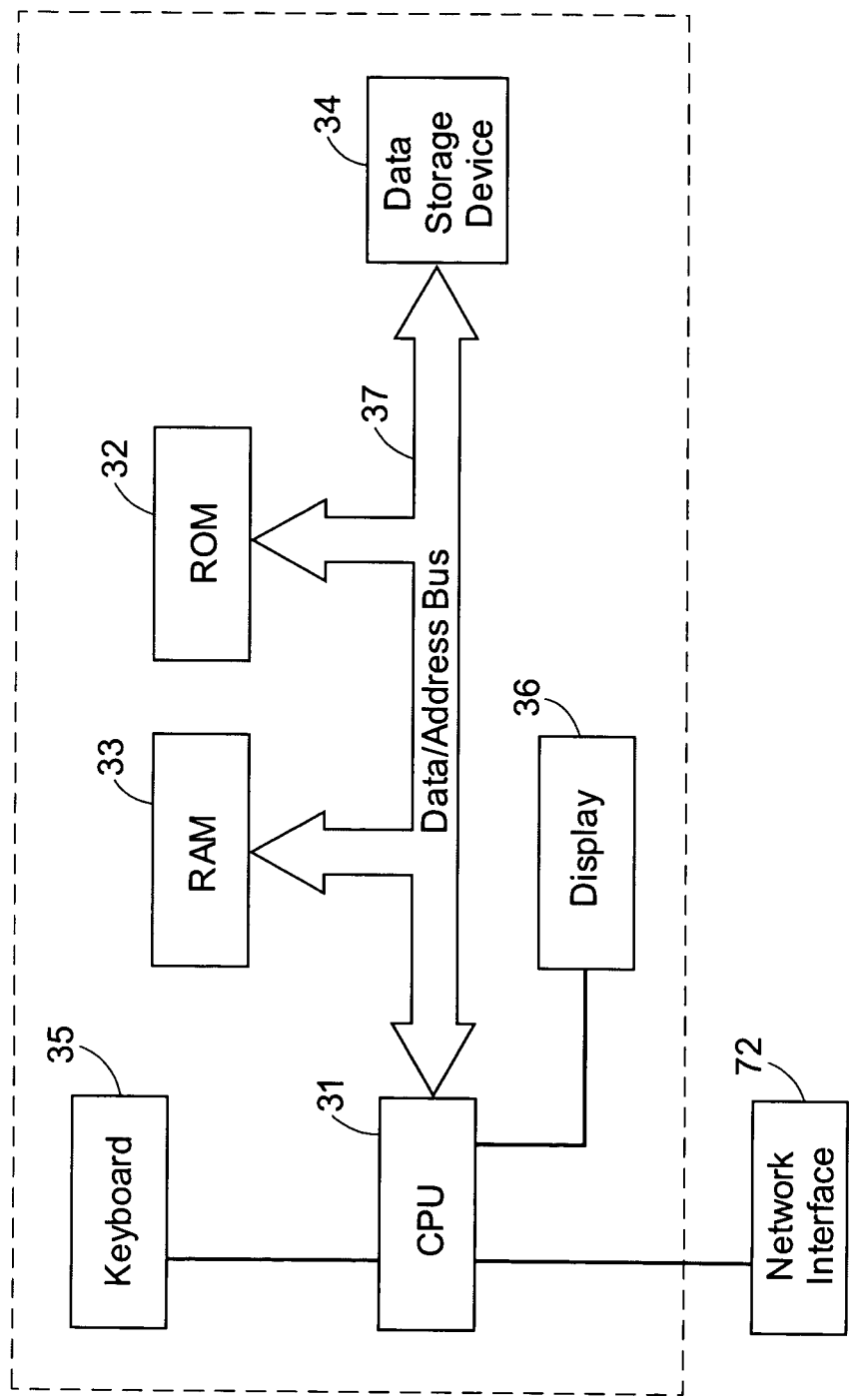
FIG. 3 is a block diagram of a computer system for executing the program that drives the system of the present invention.

An example of a computer system for executing the program that drives the system of the present invention is shown in FIG. 3. The system includes a CPU 31 that performs processing functions. Also included is read only memory 32 (ROM), which stores at least some of the program instructions to be executed by CPU 31, such as portions of the operating system or basic input-output system (BIOS), and random access memory 33 (RAM) used for temporary storage of data. The computer also includes a network interface 72 which enables communication with external devices, such as the computers located at participant financial institutions. A data storage device 34 is provided to allow for storage of data. Data storage device 34 may be written to or read from the CPU 31. Data/Address bus 37 connects the ROM 32, RAM 33 and data storage device 34 to the CPU. A keyboard is preferably provided to receive input from an operator. However any conventional method of operator input may be used. A display is preferably provided for conveying information to the operator of the computer.

A participant's primary connection to the System generally consists of a dedicated line leased from a telephone company by the Clearing House for that purpose. A participant may use a secure Internet connection that meets the standards for such a connection established by CHIPS to send and receive administrative messages to perform the following functions, which are discussed in further detail below: (i) set, remove, or change a priority designation; (ii) establish or change a reserve supplemental position; and (iii) request a withdrawal under or make certain types of inquiries. Documents describing the standards and communication protocols (and other functional requirements) for a participant's computer interface to the System are furnished by the Clearing House.

Each participant must maintain adequate primary and backup computer facilities. A backup computer must be able to emulate fully the primary computer with respect to functions and capacity and must afford the same level of message authentication security as the primary computer. The backup computer should not be located in the same power grid as the primary computer. Such backup computer facilities must meet relevant standards adopted by the Clearing House. Any primary or backup computer linked to the System may be located only where there are adequate arrangements for on-site review of a participant's payment processing and computer facilities, adequate access to digital telecommunications facilities, adequate arrangements for necessary authentication and security devices, and adequate assurances that operation of the System is not be subject to interruption or interference by internal or external political developments.

IV. Detailed Procedures for Delivering, Storing, Releasing and Receiving Payment Messages A participant may deliver a payment message to CHIPS for storage and release in accordance with the following rules. A participant may delete a stored payment message until the system has closed for the delivery of payment messages, unless CHIPS has released the payment message to the receiving participant. After a payment message has been released by CHIPS, it cannot be deleted by the Sending participant. Before its release, the CEO (i.e., the chief executive officer of the Clearing House or his or her designee) may delete from storage any payment message delivered by any participant or that is in storage to be sent to any participant.

A participant may designate a payment message as an "urgent payment message" or as a "preferred payment message." A payment message that has been designated as an urgent payment message or a preferred payment message is a "priority payment message," and a payment message that has not been so designated is a "non-priority payment message." A designation may occur when the participant delivers the payment message to the Clearing House or while the payment message is held in storage. With respect to a stored payment message, a participant may instruct the Clearing House to add, change, or remove a priority designation from a payment message at any time up to the time that the payment message has been released. The Clearing House acts on a participant's instruction to add, change, or remove a priority designation with respect to a stored payment message if it receives the instruction within a reasonable time before the payment message has been released. Designation, change, or removal of a designation must be accomplished using certain prescribed formats.

CHIPS controls the release of each payment message to any receiving participant in accordance with the procedures described below. When a payment message has been released by CHIPS, it is deemed to have been sent by the sending participant and received by the receiving participant. CHIPS does not release any payment message from a sending participant on any day until that participant has transferred, directly or indirectly, funds in the amount of its initial opening position requirement to the prefunded balance account. Moreover, CHIPS does not release any payment message to a receiving participant on any day until that participant has transferred, directly or indirectly, funds in the amount of its initial opening position requirement to the prefunded balance account, and, as a sending participant, has begun to deliver payment messages to the Clearing House.

A sending participant does not become obligated to pay the amount of a payment message to the receiving participant until CHIPS has released the payment message to the receiving participant. Release of a payment message by CHIPS to the receiving participant creates an obligation of the sending participant to pay the receiving participant the amount of the payment message. Simultaneously with the release of a payment message, this payment obligation is settled in accordance with procedures discussed below. The completion of settlement of any payment message in accordance with the procedures discussed below constitutes a final settlement of that payment message and a final discharge and payment of the sending participant's obligation to pay the amount of that payment message to the receiving participant.

V. Detailed Procedures Relating to Prefunded Balance Account and Current Positions A. Prefunded Balance Account Each funding participant must become a party to the CHIPS Prefunded Balance Account Agreement, under which the CHIPS prefunded balance account is established at the Federal Reserve Bank of New York (FRBNY). A participant may, and if it is not eligible to open its own account at a Federal Reserve Bank must, designate as its funding participant another participant that is eligible to open an account at a Federal Reserve Bank. FRBNY holds all funds deposited in the CHIPS prefunded balance account for the joint benefit of all the funding participants and payable exclusively in accordance with the instructions of the Clearing House as agent on behalf of all funding participants. However, the records in the System's books are not records of FRBNY, and FRBNY does not take any action during the day to adjust its records in connection with payment messages released by CHIPS.

B. Primary Prefunding

At certain intervals, but generally no less frequently than once each month, the Clearing House calculates for each participant its "desired opening position" in accordance with a formula that is reasonably designed to facilitate the CHIPS payment message release methodology. The Clearing House transmits to each participant a report showing the desired opening position and the period during which the desired opening position is effective ("opening position effective period"). A participant's "opening position requirement" for any opening balance effective period is the lesser of its desired opening position for the current opening position effective period or the desired opening position for the immediately preceding opening position effective period.

Each day, each participant must arrange to have funds in the amount of its opening position requirement transferred finally and irrevocably to the prefunded balance account. These finds transfers may be sent directly by the participant itself or indirectly through another financial institution that has an account at a Federal Reserve Bank. These transfers must be completed by certain established deadlines. If a participant transfers to the prefunded balance account funds in excess of its desired opening position for the current opening position effective period, the Clearing House promptly returns to the participant (or the financial institution that sent the funds transfer to the prefunded balance account on the participant's behalf) an amount sufficient to reduce the participant's opening primary position to the desired opening position for the current opening position effective period. Any amount so returned is not included in the calculation of the participant's opening primary position or used in the calculation of the maximum current primary position.

Upon receipt of advices from FRBNY, the Clearing House makes a record in the System's books of the amount that each participant has transferred, directly or indirectly, to the prefunded balance account (i.e., the participant's opening primary position). Following the recording of a participant's opening primary position and continuously throughout the day, the Clearing House records entries on the System's books to adjust a participant's opening primary position to reflect all decreases and increases in a participant's opening primary position. The intraday record of each participant's opening primary position, as adjusted to reflect all decreases and increases recorded, is referred to herein as the participant's "current primary position."

C. Supplemental Prefunding

At any time following the transfer of its opening position requirement, but before the System has closed for the delivery of payment messages, a participant may directly or indirectly transfer additional funds to the prefunded balance account (i.e., the participant's "supplemental transfer"). Upon receipt of an advice of credit from FRBNY, the Clearing House makes a record in the System's books of the supplemental transfer as the participant's "initial supplemental position." If a participant has not made a supplemental transfer to the CHIPS prefunded balance account, but receives one or more payment messages settled in whole or in part by a reduction in the sending participant's initial or current supplemental position, the Clearing House records the corresponding increase in the receiving participant's supplemental position resulting from the settlement of the first such payment message as the receiving participant's initial supplemental position.

Following the recording of a participant's initial supplemental position and continuously throughout the day, the Clearing House records entries on the System's books to adjust the participant's initial supplemental position to reflect all increases and decreases in its initial supplemental position due to the receipt of additional supplemental transfers to the prefunded balance account or due to a withdrawal. The intraday record of each participant's initial supplemental position, as adjusted to reflect all increases and decreases referred to in this paragraph is the participant's current supplemental position. In addition, a participant may designate that a portion of the current supplemental position attributable to it any time that is equal to the sum of all supplemental transfers it has made, less the amount of any withdrawals, as its reserved supplemental position to be used exclusively for the settlement of payment messages that have been designated as priority payment messages.

The sum of each participant's current primary position and its current supplemental position is referred to as its "combined position." Each participant's combined position, as adjusted to reflect all intraday decreases and increases, is referred to as the participant's "final position."

D. Position Limits

A payment message is not released if the decreases to be recorded for the sending participant or the increases to be recorded for the receiving participant would cause the current primary position of the sending participant or the receiving participant to be less than zero (i.e., the "minimum current primary position") or, except during the end-of-day closing procedure discussed below, would cause the current position of the sending participant or the receiving participant to exceed an amount equal to twice its opening primary position requirement.

CHIPS calculates for each participant a "maximum current supplemental position" in accordance with a formula that is reasonably designed to facilitate the CHIPS payment message release methodology. A non-priority payment message is not released if the decreases to be recorded in the current supplemental position of the sending participant and the corresponding increases to be recorded in the current supplemental position of the receiving participant would cause the receiving participant's current supplemental position to exceed its maximum current supplemental position. The maximum current supplemental position limit does not apply to payment messages designated as priority payment messages. A payment message is not released if the decreases to be recorded for the sending participant would cause its current supplemental position to be less than zero ("minimum current supplemental position"). In addition, a payment message is not released if the decreases to be recorded for the sending participant would cause its combined position to be less than zero ("minimum combined position").

E. Withdrawals from the Prefunded Balance Account.

A participant may request a transfer of funds from the prefunded balance account to that participant in an amount up to the lesser of: (i) the participant's current supplemental position, or (ii) the sum of all supplemental transfers it has made up to the time of its request, less any amount that has already been transferred to the participant (i.e., the participant's "withdrawable amount"). A participant's current combined position, less its withdrawable amount, at any point in time represents the amount that is to become due to that participant following the close of business on that day contingent on the event that no additional payment messages to or from that participant are released and settled.

VI. Detailed Procedures Relating to Settlement

A. Release Methodology

CHIPS uses a methodology for controlling the release of payment messages that has the following characteristics. The methodology is reasonably designed to ensure that: (i) no participant's current primary position is either less than its minimum current primary position or, except during the end-of-day closing procedures, more than its maximum current primary position; (ii) the sum of the current primary positions of all participants remains the same following the release as it was before the release; (iii) no participant's current supplemental position is less than its minimum current supplemental position; (iv) the release of a non-priority payment message to a receiving participant does not cause the receiving participant's current supplemental position to exceed its maximum current supplemental position; (v) the sum of the current supplemental positions of all participants remains the same following the release as it was before the release; (vi) no participant's combined position is less than its minimum combined position; and (vii) if a participant has designated a portion of its current supplemental position as its reserved supplemental position, CHIPS does not use the reserved supplemental position to settle: (a) non-priority payment messages; or (b) preferred payment messages if the participant has any unreleased urgent payment messages.

The methodology is also reasonably designed to release: (i) urgent payment messages before preferred payment messages and preferred payment messages before non-priority payment messages; and (ii) payment messages that share the same priority designation in the order in which they were received. These sequences may be varied depending on the mix of payment messages in each priority designation and the current positions of the sending and receiving participants or to increase the number or value of payment messages that can be released and settled before the close of the System for delivery of payment messages.

Other aspects of the methodology include the following. The methodology may release a payment message as soon as it has been delivered by the sending participant or hold it in storage for release at a later time. The methodology may include individual release of payment messages, bilateral netting and release of payment messages, multilateral netting and release of payment messages, or any combination of these. From time to time, the methodology used by CHIPS may be adjusted as part of continuing efforts by the Clearing House to increase the number or value of payment messages that can be released and settled before the close of the System for delivery of payment messages.

B. Balanced Release Algorithm

A computer-based system, including a computer program, is used to control the release of payment messages. This program (the "balanced release algorithm") continuously matches, nets, sets off, and releases payment messages throughout the day. All incoming payment messages are received by the system and held in a queue or, preferably several queues for release when the requirements of the computer program are satisfied. The program broadly classifies each payment message as large (e.g., equal to or greater than 80 percent of the lesser of the sending participant's opening primary position and the receiving participant's opening primary position) or small (e.g., less than 80 percent of the lesser of these values).

The program releases payments individually, in bilateral batches, or in multilateral batches, and release notification is sent to the sending participant while a receive notification is sent to the receiving participant. The release of a large payment individually could cause the sending participant to fall below its minimum current primary position or cause the receiving participant to exceed its maximum current primary position (except that, as discussed above, urgent and preferred payment messages are sent to a receiving participant without regard to any maximum position limits on the receiving participant). Therefore, the balanced release algorithm searches for payments that can be included in a batch and netted against the large payment message. If necessary, other "helper" payment messages from other participants may be added to the batch, and all the payment messages in the batch are netted and set-off against one another so that the net changes to the available balance of each participant with payment messages in the batch will not cause any participant's available balance to drop below its minimum or exceed its maximum. This batching will be discussed in greater detail below.

The balanced release algorithm releases small payments, e.g., those less than 80% of the lower of the opening primary positions of the sending participant and receiving participant, individually (without batching) from bilateral, first-in-first-out (FIFO) queues, resident in the central computer storage, upon which incoming payment orders are placed upon receipt, as the current primary positions of the sending and receiving participants permit. Neither the minimum nor maximum current primary positions discussed above may be exceeded following the release of a payment (except with respect to urgent and preferred payment messages, as discussed above). The earliest queued payments are considered first, e.g., the messages may be released in system sequence number (SSN) order. In addition, a matching technique, e.g., based upon the Gale-Shapley algorithm, may be used to find an optimum match of sending participants with receiving participants.

The balanced release algorithm releases payments with the aid of multilateral and bilateral batching. Large queued payments are batched bilaterally as follows. When a large payment order from bank A to bank B is queued, a check is made to see whether there is another payment order from bank B to bank A already queued that is between half as large and twice as large as the first payment order. If so, such a second payment order is chosen and is batched with the first one. The result is a "pseudo-payment" whose amount is the difference of the amounts of the original two payment orders. This difference is less than or equal to each of the amounts of the two payment orders in the batch. The direction of the pseudo-payment is the direction of the larger payment order.

After a pseudo-payment is formed, the process is repeated iteratively until no suitable "second" payment order is available. At each step, the size of the pseudo-payment gets smaller or, at worst, remains the same. Thus, the overall effect of bilateral batching is to reduce the size and number of the payments to be released. These pseudo-payments are then released either as small payments as described above, or as large payments, using multilateral batching, described next. When the system "releases" a pseudo-payment, it releases all of the batched payments linked into the pseudo-payment in one transaction.

Multilateral batching is utilized in the system of the present invention to provide a means to release payments (and pseudo-payments) larger than the flow cap—even payments falling outside of the participants' minimum and maximum current primary positions. When a large payment is queued, after any bilateral batching has been done, a check is begun to see whether any large payments on the queue can be released. When considering the release of a given large payment P from bank A to bank B, usually such a release would lower the position of bank A below its minimum current primary position, and might also raise the position of bank B beyond its maximum current primary position. Therefore, helper payments are used to bank A from third party participants currently in a credit position to produce a net position at bank A that is within the prescribed limits. Helper payments are chosen initially with only the position at bank A in mind.

Figure 4:
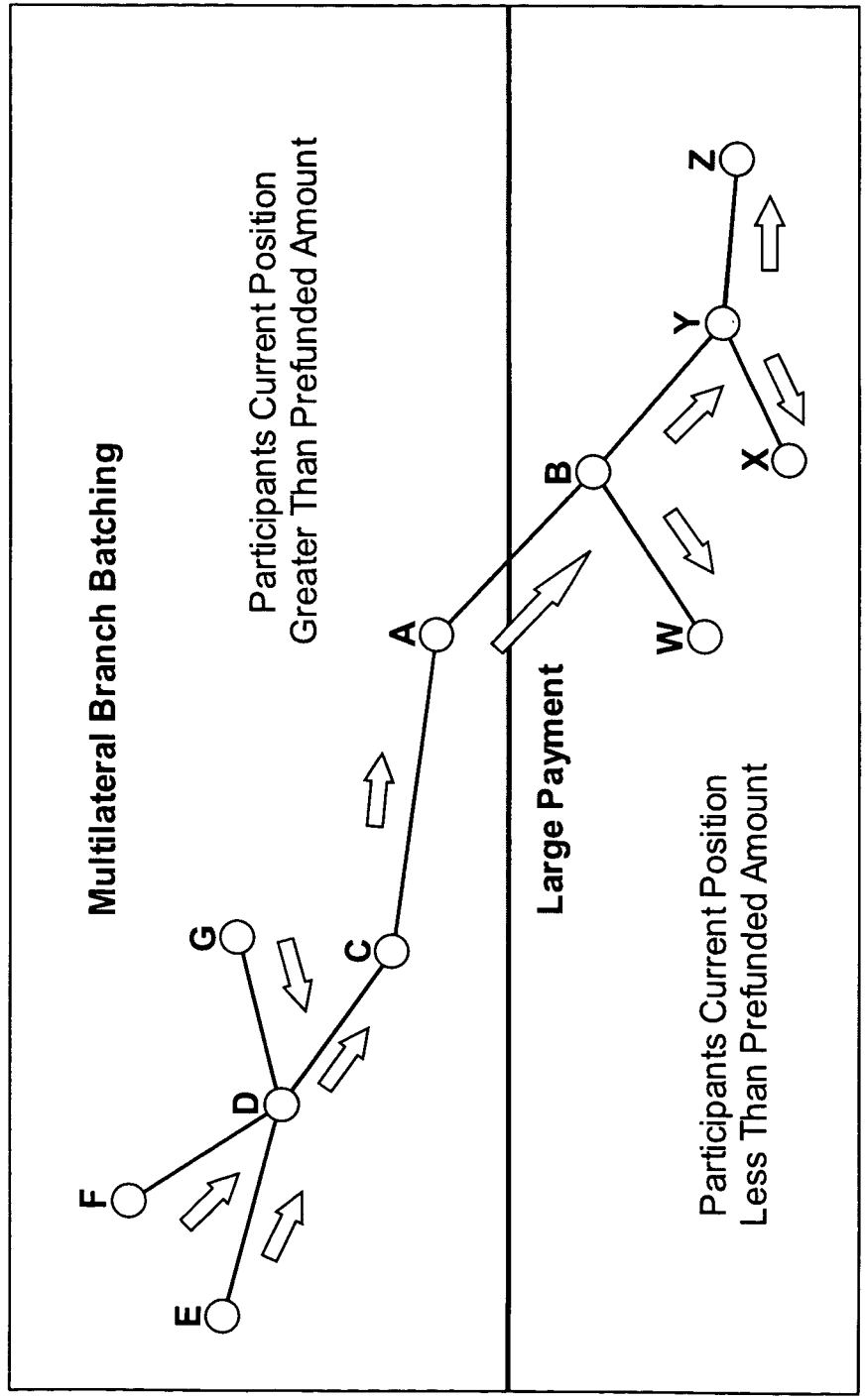
FIG. 4 is a tree structure used to perform multilateral batching to release large payments.

At each stage of the construction of the multilateral batch, a tree of payments exists directed downward toward the root participant bank, e.g., Bank A. An example of such a tree is shown in FIG. 4, which will be discussed in greater detail below. participants at nodes of the tree, e.g., Bank B, with both incoming and outgoing branches satisfy their limit constraints. Leaf (terminal) nodes of the tree are participants that may exceed their maximum current primary position, and which therefore may themselves need helper payments. Any participant in the tree that needs help of this sort is later either supplied with the help or is discarded, cutting back the tree.

If the construction succeeds, a tree of payments is obtained among the participants previously in a credit position such that every participant position in the tree, including participant Bank A, is within its prescribed limits. If the above tree can be created, an attempt is made to accomplish the analogous situation at Bank B using payments to participants previously in a debit position. Another tree is constructed, if possible, so that every participant position in the second tree is within the prescribed limits. If all this is accomplished successfully, all of the payments taken together constitute a multilateral batch and are released in a single transaction.

C. Intraday Settlement Procedures

Payment messages released before the close of the System for the delivery of payment messages are settled in accordance with the following Intraday Settlement Procedures. Payment messages released after the close of the System for the delivery of payment messages are settled in accordance with the end-of-day closing procedures discussed below.

For "individual release," the following procedures are used. If a payment message is released individually, CHIPS decreases the sending participant's current primary position or current supplemental position or both (depending upon, inter alia, the priority of the message and whether a portion of the supplemental position has been reserved, as discussed above in "Overview of Supplemental Funding") by amounts that total the amount of the payment message and increases the receiving participant's current positions by amounts that are equal to the decreases in the sending participant's corresponding current positions. The release of the payment message and the recording of these entries is deemed to be effective simultaneously. Settlement with respect to the payment message is complete when the System has recorded the decreases in the sending participant's current positions and the increases in the receiving participant's current positions. Completion of settlement constitutes final settlement of that payment message and final discharge and payment of the sending participant's obligation to pay the amount of the payment message to the receiving participant.

For "bilateral netting and release," the following procedures are used. If a payment message is released in a batch that consists of one or more payment messages from first participant to second participant, and one or more payment messages from the second participant to the first participant, the obligation of the first participant to pay the second participant for the amount of any payment messages in the batch that the first participant is sending to the second participant is netted by setting off and applying the obligation of the second participant to pay the first participant for the amount of any payment messages in the batch that it is sending to the first participant. The balance remaining from this netting is referred to as the "bilateral net balance." The current positions of each participant with payment messages in the batch is decreased by amounts that total the amount of each payment message in the batch for which it is the sending participant and, for each payment message for which it is the receiving participant, increased by amounts that are equal to the decreases in the sending participant's corresponding current positions.

As a result of these entries, the current positions of the participant whose bilateral net balance is positive is increased by an amount equal to the amount of the bilateral net balance and the current positions of the participant whose bilateral net balance is negative is decreased by the amount of the bilateral net balance. The release of these payment messages, the netting of these obligations, and the recording of these entries is deemed to be effective simultaneously. Settlement with respect to all payment messages in the batch is complete when the System has recorded the decreases and increases of the amounts of the payment messages in the batch to the current positions of the participants. Completion of settlement constitutes final settlement of all payment messages in the batch and final discharge and payment of the obligations of each participant as a sending participant to pay the amount of each payment message in the batch that is released to the other participant as a receiving participant.

For "multilateral netting and release," the following procedures are used. If a payment message is released in a batch that includes payment messages to or from three or more participants, the obligation of each participant to pay the amount of each payment message sent by it as a sending participant in the batch to another participant as a receiving participant is netted by setting off and applying against the sending participant's obligation the right of the sending participant to receive payment from the receiving participant of the amount of any other payment message sent to the sending participant by the receiving participant in the batch. The balance resulting from this netting equals the bilateral net balance between each pair of participants.

The bilateral net balance of obligations owed by each sending participant to each receiving participant with respect to payment messages in the batch is netted by setting off and applying against that balance the bilateral net balance of obligations owed to the sending participant by other participants who have payment messages sent through CHIPS in the batch. The balances resulting from this netting are referred to as the "multilateral net balances." The current positions of each participant with payment messages in the batch is decreased by amounts that total the amount of each payment message in the batch for which it is the sending participant and increased in respect of payment messages for which it is the receiving participant by amounts that are equal to the decreases in the sending participant's corresponding current positions.

As a result of these entries, the current positions of a participant whose multilateral net balance is positive is increased by the amount of its multilateral net balance and the current positions of a participant whose multilateral net balance is negative is decreased by the amount of its multilateral net balance. The release of these payment messages, the netting of these obligations, and the recording of these entries is deemed to be effective simultaneously. Settlement with respect to all payment messages in the batch is complete when the System has recorded the decreases and increases of the amounts of the payment messages in the batch to the current positions of the participants. Completion of settlement constitutes final settlement of all payment messages in the batch and final discharge and payment of the obligation of each participant as a sending participant to pay the amount of each payment message in the batch that is released to another participant as a receiving participant.

D. End-of-Day Closing Procedure

The following procedures, as shown in FIG. 5, are used for initial closing, netting, and release. Immediately following the close of the System for the delivery of payment messages, CHIPS nets, sets off, and releases as many of the payment messages that remain in storage as possible (Step 505) using the intraday settlement procedures described above, except that prior to Step 505 CHIPS combines the current primary position and the current supplemental position of each participant into the participant's combined position (Step 500) and applies no limits to the participant's combined position other than the minimum combined position. Settlement with respect to all payment messages released as part of this procedure is complete when the System has recorded the decreases and increases to the current combined positions. Completion of settlement constitutes final settlement of all payment messages released as part of this procedure and final discharge and payment of the obligation of a participant as a sending participant to pay the amount of each payment message released as part of this procedure to another participant as a receiving participant.

In calculating closing positions, if any payment messages remain in storage following the procedures described above, CHIPS calculates a multilateral net balance for all participants based on the payment messages in storage, without actually releasing any of those payment messages (Step 510). The resulting multilateral net balance for each participant is combined with that participant's current combined position to calculate the participant's "closing position" (Step 515). If a participant's closing position is a negative number, it is the participant's "closing position requirement." Following this calculation, the Clearing House prepares and sends to each participant an "Initial End-of-Day Balance Report" showing its closing position (Step 520). The Initial End-of-Day Balance Report of each funding participant also shows the closing position of each participant for which it has been designated funding participant.

To complete final specified prefunding, netting, and release, each participant with a closing position requirement is given a specified period (unless additional time is allowed by the CEO), e.g., 30 minutes, from the time that the Clearing House sends the Initial End-of-Day Balance Reports to pay the amount of its closing position requirement by transferring the appropriate funds finally and irrevocably to the prefunded balance account (Step 525).

If all of these closing transfers are made (Step 530), all of the payment messages that remain in storage are netted, set off, and released (Step 535) as in the intraday settlement procedures, except that CHIPS combines the current primary position and the current supplemental position of each participant into the participant's combined position and applies no limits to the participant's combined position other than the minimum combined position. The release of these payment messages, the netting of these obligations, and the recording of these entries is deemed to be effective simultaneously. Settlement with respect to all payment messages released as part of this procedure is complete when the System has recorded the decreases and increases to the current combined positions. Completion of settlement constitutes final settlement of all payment messages released as part of this procedure and final discharge and payment of the obligations of a participant as a sending participant to pay the amount of each payment message released as part of this procedure to another participant as a receiving participant.

A participant's current combined position resulting from the release of any payment messages and recording of the entries made pursuant to this procedure is the participant's final position (Step 540). After the release of all payment messages remaining in storage, the Clearing House transfers from the prefunded balance account to the account of each funding participant whose final position is greater than zero (545). The total of the funds transfers made to the participants in this manner equals the balance in the prefunded balance account.

If one or more of the closing transfers discussed above has not been made within the appropriate time period, the current combined position of each participant whose closing position requirement has been paid completely or partially is increased by the amount so paid, and the Clearing House nets, sets off, and releases as many of the payment messages that remain in storage as is possible (Step 550) using the intraday settlement procedures described above, except that CHIPS combines the current primary position and the current supplemental position of each participant into the participant's combined position and applies no limits to the participant's combined position other than the minimum combined position, and taking account of the additions to the current combined positions. Settlement with respect to all payment messages released as part of this procedure is complete when the System has recorded the decreases and increases to the current combined positions. Completion of settlement constitutes final settlement of all payment messages released as part of this procedure and final discharge and payment of the obligations of a participant as a sending participant to pay the amount of each payment message released as part of this procedure to another participant as a receiving participant. A participant's current combined position resulting from the release of any payment messages and recording of the entries made pursuant to this procedure is the participant's final position.

Any payment message remaining in storage, following the netting, set-off, and release of any payment messages as described immediately above, expires as of the time of the calculation of the final positions, and the Clearing House notifies the sending participant of the expiration. Expiration of a payment message is effective as the cancellation of the payment message by the sending participant (Step 555). After all payment messages have been released or have expired, the Clearing House determines the final position of each participant (Step 560) transfers from the prefunded balance account to the account of each funding participant whose final position is greater than zero funds in the amount of its final position (Step 565). The total amount of the funds transfers made to the participants in this manner equals the balance in the prefunded balance account.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A method for continuous intraday final settlement of payment orders among a plurality of participants, each participant having facilities configured to electronically send and receive the payment orders in the form of payment messages, the method comprising the steps of:

storing a plurality of primary positions, corresponding to balances in a prefunded balance account, each position representing a right of one of the participants to payment from the prefunded balance account;

storing a plurality of supplemental positions, corresponding to balances in the prefunded balance account, each position representing a right of one of the participants to payment from the prefunded balance account;

receiving a payment message from a sending participant of the plurality of participants;

releasing the payment message in accordance with at least one algorithm that enforces distinct rule sets on primary positions and supplemental positions; and wherein the at least one algorithm comprises at least the following rule: each withdrawing participant of the plurality of participants can withdraw funds from a respective supplemental position of the withdrawing participant when the funds are less than or equal to an amount of supplemental position deposits made to the prefunded balance account by the withdrawing participant.

2. The method of claim 1 further comprising:

determining, for the payment message, if the supplemental position of the sending participant of the payment message, after subtraction of a payment amount of the selected payment message, is greater than or equal to a predetermined minimum for the sending participant's supplemental position;

determining if the supplemental position of a receiving participant of the selected payment message, after addition of the payment amount, is less than or equal to a predetermined maximum for the receiving participant's supplemental position;

wherein the payment message is released in accordance with the at least one algorithm, such that the sending participant's supplemental position is decreased by the payment amount and the receiving participant's supplemental position is increased by the payment amount, if it is determined that: (i) the sending participant's supplemental position, after subtraction of the payment amount, is greater than or equal to the predetermined minimum for the sending participant's supplemental position, and (ii) the receiving participant's supplemental position, after addition of the payment amount, is less than or equal to the predetermined maximum for the receiving participant's supplemental position;

wherein if it is determined that the sending participant's supplemental position, after subtraction of the payment amount, is less than the predetermined minimum for the sending participant's supplemental position, the method further comprising the steps of:

dividing the payment amount into a primary payment portion and a supplemental payment portion, such that the sending participant's supplemental position, after subtraction of the supplemental payment portion, is greater than or equal to the predetermined minimum for the sending participant's supplemental position;

determining if the sending participant's primary position, after subtraction of the primary payment portion, is greater than or equal to a predetermined minimum for the sending participant's primary position;

determining if the receiving participant's primary position, after addition of the primary payment portion, is less than or equal to a predetermined maximum for the receiving participant's primary position; and releasing the payment message, such that the sending participant's primary position is decreased by the primary payment portion and the receiving participant's primary position is increased by the primary payment portion, and the sending participant's supplemental position is decreased by the supplemental payment portion and the receiving participant's supplemental position is increased by the supplemental payment portion, if it is determined that: (i) the sending participant's primary position, after subtraction of the primary payment portion, is greater than or equal to the predetermined minimum for the sending participant's primary position, and (ii) the receiving participant's primary position, after addition of the primary payment portion, is less than or equal to the predetermined maximum for the receiving participant's primary position.

3. The method of claim 1, further comprising the step of accepting designation of at least one of the plurality of payment messages as a priority message.

4. The method of claim 3, further comprising the step of allowing a participant to reserve a portion of the participant's supplemental position for payment of priority payment messages.

5. A computer-readable medium storing code executable by a computer, the code controlling the computer to perform a method for continuous intraday final settlement of payment orders among a plurality of participants, each participant having facilities configured to electronically send and receive the payment orders in the form of payment messages, the method comprising the steps of:

storing a plurality of primary positions, corresponding to balances in a prefunded balance account, each position representing a right of one of the participants to payment from the prefunded balance account;

storing a plurality of supplemental positions, corresponding to balances in the prefunded balance account, each position representing a right of one of the participants to payment from the prefunded balance account;

receiving a payment message from a sending participant of the plurality of participants;

releasing the payment message in accordance with at least one algorithm that enforces distinct rule sets on primary positions and supplemental positions; and wherein the at least one algorithm comprises at least the following rule: each withdrawing participant of the plurality of participants can withdraw funds from a respective supplemental position of the withdrawing participant when the funds are less than or equal to an amount of supplemental position deposits made to the prefunded balance account by the withdrawing participant.

6. The computer-readable medium of claim 5 wherein the method further comprises:

determining, for the payment message, if the supplemental position of the sending participant of the payment message, after subtraction of a payment amount of the selected payment message, is greater than or equal to a predetermined minimum for the sending participant's supplemental position;

determining if the supplemental position of a receiving participant of the selected payment message, after addition of the payment amount, is less than or equal to a predetermined maximum for the receiving participant's supplemental position;

wherein the payment message is released in accordance with the at least one algorithm, such that the sending participant's supplemental position is decreased by the payment amount and the receiving participant's supplemental position is increased by the payment amount, if it is determined that: (i) the sending participant's supplemental position, after subtraction of the payment amount, is greater than or equal to the predetermined minimum for the sending participant's supplemental position, and (ii) the receiving participant's supplemental position, after addition of the payment amount, is less than or equal to the predetermined maximum for the receiving participant's supplemental position;

wherein if it is determined that the sending participant's supplemental position, after subtraction of the payment amount, is less than the predetermined minimum for the sending participant's supplemental position, the method further comprising the steps of:

dividing the payment amount into a primary payment portion and a supplemental payment portion, such that the sending participant's supplemental position, after subtraction of the supplemental payment portion, is greater than or equal to the predetermined minimum for the sending participant's supplemental position;

determining if the sending participant's primary position, after subtraction of the primary payment portion, is greater than or equal to a predetermined minimum for the sending participant's primary position;

determining if the receiving participant's primary position, after addition of the primary payment portion, is less than or equal to a predetermined maximum for the receiving participant's primary position; and releasing the payment message, such that the sending participant's primary position is decreased by the primary payment portion and the receiving participant's primary position is increased by the primary payment portion, and the sending participant's supplemental position is decreased by the supplemental payment portion and the receiving participant's supplemental position is increased by the supplemental payment portion, if it is determined that: (i) the sending participant's primary position, after subtraction of the primary payment portion, is greater than or equal to the predetermined minimum for the sending participant's primary position, and (ii) the receiving participant's primary position, after addition of the primary payment portion, is less than or equal to the predetermined maximum for the receiving participant's primary position.

7. The computer-readable medium of claim 5, further comprising the step of accepting designation of at least one of the plurality of payment messages as a priority message.

8. The computer-readable medium of claim 7, further comprising the step of allowing a participant to reserve a portion of the participant's supplemental position for payment of priority payment messages.

9. A system for performing continuous intraday final settlement of payment orders among a plurality of participants, each participant having facilities configured to electronically send and receive the payment orders in the form of payment messages, the system including a central computer comprising:

- storage for a plurality of primary positions, corresponding to balances in a prefunded balance account, each position representing a right of one of the participants to payment from the prefunded balance account;
- storage for a plurality of supplemental positions, corresponding to balances in the prefunded balance account, each position representing a right of one of the participants to payment from the prefunded balance account;
- a receiver configured to receive a payment message from a sending participant of the plurality of participants; and
- a processor configured to release the payment message in accordance with at least one algorithm that enforces distinct rule sets on primary positions and supplemental positions; and
- wherein the at least one algorithm comprises at least the following rule: each withdrawing participant of the plurality of participants can withdraw funds from a respective supplemental position of the withdrawing participant when the funds are less than or equal to an amount of supplemental position deposits made to the prefunded balance account by the withdrawing participant.

\* \* \* \* \*